Patented June 17, 1952

2,600,881

UNITED STATES PATENT OFFICE 2,600,881

PURIFICATION OF TITANIUM TETRACHLORIDE

William Lewis Kay and Christian Edward Rick, Wilmington, Del., assignors to E. I. du Pont de Nemours & Company, Wilmington, Del., a corporation of Delaware No Drawing. Application July 21, 1950, Serial No. 175,294

4 Claims. (Cl. 202—57)

This invention relates to the purification of titanium tetrachloride, and more particularly to the removal of aluminum chloride therefrom.

Titanium tetrachloride is produced commercially by chlorinating, under reducing conditions, titaniferous ores such as rutile or ilmenite, or other titanium-rich materials such as those obtained by beneficiating such ores. These raw materials, in addition to their titanium values, contain varying amounts of compounds of other metals. In the chlorination conversion of the titanium and the other metal compounds to their vaporous chlorides occurs, which chlorides are then recovered and condensed to the solid or liquid state depending upon the physical properties of the component and the recovery apparatus resorted to. The crude titanium tetrachloride is usually recovered by condensing it to a liquid sludge, but this crude product is undesirably contaminated with dissolved impurities and undissolved solid materials. The amount and type of chlorides present in the crude liquid naturally depends upon the exact composition of the titaniferous raw material chlorinated and the particular chlorination method resorted to. The presence of aluminum chloride is to be expected in practically all cases where aluminum compounds are present in the raw materials.

The removal of aluminum chloride and other contaminating chloride compounds comprises a major obstacle in the efforts being constantly made to obtain titanium terachloride in a pure, water-white state. The most usual purification procedure is to subject the crude liquid to distillation to separate out a number of its less volatile components. Aluminum chloride removal can be effected to a fairly adequate extent, provided use of an efficient rectification system is also resorted to. However, a serious disadvantage attends the use of this method which heretofore has been impossible to overcome. This arises from the fact that the aluminum compound present in the crude TiCl$_4$ is highly corrosive, and disadvantageously quickly and severely attacks metallic materials of construction in the purification apparatus. Consequently, the costs of maintenance and replacement of metal distillation and other purification equipment in such instances are extremely and prohibitively high. On the other hand, purified TiCl$_4$, or even TiCl$_4$ containing various other impurities but not active aluminum chloride, is relatively non-corrosive. These facts are graphically illustrated by the following results from tests on mild steel and of nickel equipment, wherein penetration or corrosion was measured in terms of inches per month on apparatus employed to distil pure TiCl$_4$, TiCl$_4$ containing active AlCl$_3$, and TiCl$_4$ containing hydrated AlCl$_3$, respectively:

|  | Inches/Month Penetration | |
|---|---|---|
|  | Mild Steel | Nickel |
| Pure TiCl$_4$+2% AlCl$_3$ (active) | .00814 | .00350 |
| Pure TiCl$_4$+2% AlCl$_3$ (as AlCl$_3$·6H$_2$O) | .00022 | .00017 |
| Pure TiCl$_4$ | .00055 | .00016 |

It is among the objects of this invention to overcome the disadvantages accompanying prior methods for purifying impurity-contaminated titanium tetrachloride, and, in particular, to minimize substantially or prevent the corrosion problems heretofore encountered in processing crude titanium tetrachloride containing active aluminum chloride. A particular object is to provide a novel method for processing TiCl$_4$ wherein metal equipment can be utilized and with a minimum of maintenance and replacement expense. Another object is to effect removal of aluminum chloride from its solution in liquid titanium tetrachloride, such as that derived from the chlorination of a titaniferous ore or other raw material, and through a relatively simple and inexpensive purification procedure. Other objects and advantages of the invention will be apparent from the ensuing description thereof.

These and other objects are attained in this invention which broadly comprises mixing with aluminum chloride-contaminated liquid titanium tetrachloride an amount of water substantially stoichiometrically equivalent to the aluminum chloride to be inactivated in said liquid and then separating the resulting aluminum chloride complex from the titanium tetrachloride to recover the latter.

In a more specific and preferred embodiment, the invention comprises subjecting liquid titanium tetrachloride, contaminated with chlorides of aluminum and other metals, to treatment with water in an amount chemically equivalent to the aluminum chloride to be removed or inactivated, and then distilling the resulting mass to vaporize and separately recover the TiCl$_4$ present in pure form and retain the resulting aluminum chloride complex and other chlorides less volatile than the TiCl$_4$ as residue in the distillation vessel.

One particularly valuable adaptation of the present process involves the preparation of pure, water-white titanium tetrachloride from the conventional chlorination, under reducing conditions, of titaniferous raw material such as an ore or a slag. Such raw material is chlorinated at elevated temperatures and in accordance with, for instance, the procedures of U. S. Patents 2,184,885, 2,184,887, 2,245,076, etc., whereby a vaporous mixture of titanium, aluminum and other chlorides is obtained. Upon condensation and recovery of the crude titanium tetrachloride product, the condensate is analyzed to determine its aluminum chloride content. A quantity of water is then mixed with the $TiCl_4$ sufficient only to react with the active aluminum chloride present therein, as a result of which the aluminum chloride appears to react selectively with the water and form in situ of the $TiCl_4$ a complex hydrate or oxychloride of low volatility, non-corrosive, and relatively inactive chemically. The resulting mass or mixture is thereafter subjected to distillation to effect volatilization and removal of the $TiCl_4$ for separate recovery through condensation, while the aluminum chloride complex, being less volatile, remains in the distillation vessel. Due to the inactive and essentially non-corrosive nature of this complex, undesired wear or corrosive attack of equipment is materially lessened or completely obviated, and recovery is thereby afforded of a $TiCl_4$ fraction substantially free of active aluminum and other less volatile contaminating chlorides.

To a clearer understanding of the invention, the following illustrative examples are given which are not to be considered as limiting its scope:

*Example I*

Ilmenite ore was mixed with coke and chlorinated with $Cl_2$ gas at about 950° C. The product vapors comprising titanium and other metal chlorides were cooled and crude $TiCl_4$ condensed to liquid form was subsequently recovered therefrom. This liquid comprised principally $TiCl_4$ with contaminating chlorides, particularly 0.55% by weight of active $AlCl_3$ and 0.15% $VOCl_3$.

The crude $TiCl_4$ was then introduced into an externally-heated distillation vessel provided with conventional agitating and associated condensing means. Liquid water in an amount equivalent to 3 parts by weight of water for 8700 parts by weight of the crude mass was then added to the liquid crude. (On a molar basis, this comprises sufficient water to react chemically with 46.5% of the active $AlCl_3$.) Water addition was effected dropwise with constant agitation and upon completion of the addition, the resulting mixture was gradually heated to about 137° C. The heating and resulting boiling operation was continued until the volume of liquid in the vessel became decreased to about one-half. Meanwhile, the vaporous $TiCl_4$ fraction volatilized and distilled off during the heating was removed and separately recovered. The residue remaining in the vessel following the distillation was analyzed and found to contain an active $AlCl_3$ content of 0.28% by weight of the original crude material. In other words, 49% of the original $AlCl_3$ had been reacted with the water to form a non-volatile complex, while 51% remained unreacted. The water added was chemically equivalent to 46.5% of the aluminum chloride in the $TiCl_4$ and was effectively useful in removing 49% of the aluminum compound. This is considered an experimental verification of the theory that one mol of $H_2O$ renders one mol of $AlCl_3$ inactive and non-volatile.

*Example II*

Another sample of the crude $TiCl_4$ obtained by the chlorination procedure described in Example I was mixed with water, utilizing the same distilling equipment and the procedures of that example were repeated. In this instance, twice as much water was introduced, i. e., an amount of water stoichiometrically equivalent to an $AlCl_3$ content of 0.50% by weight was used. The $TiCl_4$ distillate fraction recovered had a yellowish discoloration due to vanadium presence, and on being analyzed for aluminum chloride, had an active $AlCl_3$ content of less than 0.08%, indicating that essentially all of the original $AlCl_3$ had been rendered non-volatile and inactivated by the added water.

The procedure above was repeated, but the water was added after heating of the crude $TiCl_4$ had been begun and while the temperature of the latter was about 90° C. On analysis the $TiCl_4$ distillate contained 0.05% $AlCl_3$. A water-white product was obtained after refluxing the distillate in the presence of copper and redistilling.

*Example III*

The procedure and crude $TiCl_4$ of Example I were again employed but the quantity of added water was increased to that stoichiometrically equivalent to an active aluminum chloride content of 1.0% by weight in the titanium chloride. The $TiCl_4$ distillate recovered analyzed 0.01% $AlCl_3$. This product which was substantially free of aluminum chloride like the products of Examples I and II, contained approximately the same vanadium concentration and was discolored by this impurity. Vanadium chloride removal was effected by reheating the distillate after the addition of finely-divided copper and subsequently re-distilling, and a water-white titanium tetrachloride product was obtained.

*Example IV*

Samples of iron and nickel sheet metal were also tested for corrosion or penetration utilizing various $TiCl_4$ solutions, by boiling the metals for six hours in the solutions. In similar tests, the resistance of the metals to various $TiCl_4$ vapors was studied. Penetration in inches per month was calculated by the equation:

$$P = \frac{30 \times 24}{6} \times \frac{\text{sample weight loss grams}}{\text{metal density} \times \text{cm.}^2 \text{ area of sample} \times 2.54}$$

Results from these corrosion or penetration tests were as follows:

| Solution | Penetration in./mo. | | | |
| --- | --- | --- | --- | --- |
| | In Liquid | | In Vapor | |
| | Fe | Ni | Fe | Ni |
| (1) $TiCl_4$ Pure | .0001 | .0001 | .0001 | .0003 |
| (2) $TiCl_4$+1% $AlCl_3$+$H_2O$ [1] | .0001 | .0001 | .0001 | .0003 |
| (3) $TiCl_4$+1% $AlCl_3$ | .0035 | .0030 | .0010 | .0004 |

[1] Water added was equivalent chemically to 1% $AlCl_3$.

The exact nature of the chemical reaction which occurs by means of the new pre-distillation technique herein contemplated, and the reason for the efficacy of water at this early step in the purification process are not presently well understood. One theory which appears to particularly commend itself is that, following addition of the water to the titanium tetrachloride, a reaction takes place according to the equation:

$AlCl_3 + H_2O = AlOCl + 2HCl$. The aluminum chloride has a greater affinity for water than have the other components of the crude $TiCl_4$ product, so that it is on this material, quite surprisingly, that the water has the desired and selective effect. It may be, however, that the water first reacts with $TiCl_4$ to give soluble $TiOCl_2$ or another oxychloride compound and that this then reacts with $AlCl_3$ upon contact with this solute. Since it is $AlCl_3$ which is chemically active and therefore is the principal cause of metal surface corrosion, while aluminum oxychlorides, hydrates and the like are relatively inactive and non-volatile under the conditions obtaining in the usual $TiCl_4$ purification, it will be readily seen that the addition of water at this preliminary stage in the operation, as herein contemplated, simply and effectively inhibits the serious corrosion problem heretofore encountered. The above equation indicates that equimolar proportions of aluminum chloride and water are all that are necessary, and this observation has been borne out in practice. In general, one mol of water should be added for each mol of aluminum chloride to be removed from the crude $TiCl_4$. While a lesser amount can be used, since it will prove valuable in removing at least some of the $AlCl_3$ and hence lessen equipment corrosion to that extent, it will be found preferable to inactivate essentially all of the $AlCl_3$, and to utilize for that purpose a mol for mol treatment. As already noted, the use of excess water is undesirable because loss of titanium values will occur due to formation of titanium oxychlorides and the like, when active $AlCl_3$ is no longer present to react selectively with the water.

The method of incorporating the required amount of water in the crude tetrachloride is relatively unimportant, so long as an intimate mixture is obtained. The water may be added to the $TiCl_4$ by merely dropping or otherwise feeding it onto the surface of the latter, or, if preferred, can be injected into the liquid, or otherwise commingled therewith by any known and desired means. Similarly, intimate admixture can be effected through resort to any common means, such as mechanical agitation with a paddle, circulation pump, or similar media. The time required to effectuate adequate mixing and treatment appears to depend upon the efficiency of the mixing operation rather than upon the speed of chemical reaction. The temperature of the crude product in which the water is commingled is also relatively unimportant, and in the subsequent heating to effect distillation, temperatures which at least approximate the boiling point of the $TiCl_4$ component are resorted to. Advantageously, water addition to the condensate ($TiCl_4$) is effected as the latter is collected, to render the crude $TiCl_4$ non-corrosive as soon as possible, and preferably at the temperature of the condensed $TiCl_4$ as formed. The term "water" includes free water in the vapor, liquid, or solid (ice) state.

As will be evident from the foregoing, the present invention provides a novel, efficacious and surprisingly simple method for initially treating crude titanium tetrachloride containing aluminum chloride and other impurities to effectively minimize the corrosion of metal purification equipment so disadvantageous up to now, and enable ultimate recovery of a water-white product. By its use, purification of $TiCl_4$ derived from chlorination of a titaniferous ore or slag is made relatively simple and inexpensive, and distillation may now be effected readily and efficiently. This is achieved by introducing a new step into the usual purification process, after or during the condensation of the crude $TiCl_4$ product and before distillation, the addition of which step actually and unexpectedly reduces in a startling manner the costs of the purifying operation.

The process outlined is particularly useful in the conversion of impure liquid titanium tetrachloride to the purified water-white product. Water addition to the crude product, in the amounts specified, of itself does not provide a water-white product nor reduce the vanadium content of the titanium compound upon subsequent distillation. It is believed that the water simply functions to render the aluminum chloride solute inactive and less volatile by converting it to an oxychloride, such as $AlOCl$. The inactivated aluminum compound is also soluble in the $TiCl_4$ under the conditions of its preparation, but the corrosiveness of the liquid is materially decreased and may be handled in standard iron and nickel equipment without impairing the life of the equipment. Upon distillation, the aluminum compound remains in the distillation vessel as residue while the more volatile titanium chloride is separated therefrom along with impurities of similar volatility such as vanadium oxychloride $VOCl_3$. Freeing the titanium tetrachloride from volatile color-imparting impurities such as a chloride of vanadium is then conventionally effected by an additional treatment such as by distillation over a copper contact mass.

Titanium tetrachloride obtained from the chlorination of titanium ores forms a crude product of commerce having the following composition:

| | Per cent |
|---|---|
| $TiCl_4$ | 95 |
| $Cl_2$ | 2.0 |
| $AlCl_3$ | 0.5 |
| $FeCl_3$ | 0.5 |
| $SCl_2$ | 0.7 |
| $SiCl_4$ | 0.4 |
| $SnCl_4$ | 0.05 |
| $VOCl_3$ | 0.15 |
| $CO_2$ | trace |
| $CO$ | trace |
| $COCl$ | trace |
| $HCl$ | trace |

In accordance with the invention, it will be found advantageous to incorporate therein an amount of water up to the quantity of aluminum chloride present immediately after its condensation and segregation, so that the life of the equipment will thereby be advantageously increased. It has also been found that water addition decreases the electrical conductivity of the titanium tetrachloride product containing a small amount of $AlCl_3$. It appears that this increased conductivity of the solution of aluminum chloride in $TiCl_4$ is related in some way with corrosiveness. By the water treatment herein contemplated, a method is provided for decreasing the conductivity and thereby the corrosiveness of the chemical.

In the specification reference has been made to the inactivation of aluminum chloride by the addition of water. It is understood thereby that aluminum, when present as dissolved $AlCl_3$, is considered to be "active" and that when present as $AlOCl$, it is "inactive." Crude $TiCl_4$ may contain aluminum in both forms and accordingly it will be found to be advantageous to determine the amount of water necessary to react with the active aluminum to convert it to the inactive condition. When water in excess of that amount is used, titanium oxychloride is produced with consequent loss of the chemical being purified or treated. To avoid this, it will be found desirable to employ only such amount of water as is substantially equivalent to the aluminum chloride being inactivated.

We claim as our invention:

1. A process for the removal of aluminum chloride in solution with liquid titanium tetrachloride which comprises mixing with said liquid an amount of water sufficient only to react with the active aluminum chloride to be removed therefrom, and then separating the titanium tetrachloride from the resulting aluminum chloride complex.

2. A process for the removal of aluminum chloride contaminant from liquid titanium tetrachloride which comprises incorporating in the tetrachloride about one mol of water for each mol of aluminum chloride present therein, and then subjecting the resulting mass to distillation to separate the titanium tetrachloride from the residual contaminants.

3. A process for purifying titanium tetrachloride obtained from the chlorination of a titaniferous material to remove aluminum chloride contaminant therefrom which comprises adding to said tetrachloride one mol of water for each mol of aluminum chloride present, distilling the mass to separate out the less volatile chlorides, and recovering pure titanium tetrachloride from the titanium tetrachloride fraction.

4. An improved process for the production of purified $TiCl_4$ from impure $TiCl_4$ containing as impurities aluminum and vanadium chlorides which comprises rendering the aluminum chloride inactive and non-volatile by adding thereto one mol of water for each mol of the $AlCl_3$ present, distilling the resulting product to obtain a discolored vanadium-containing distillate, and then refluxing said distillate in the presence of copper as a contact mass.

WILLIAM LEWIS KAY.
CHRISTIAN EDWARD RICK.

REFERENCES CITED

The following references are of record in the file of this patent:

UNITED STATES PATENTS

| Number | Name | Date |
|---|---|---|
| 2,512,807 | Nicholson | June 27, 1950 |

OTHER REFERENCES

Mellor Inorganic and Theoretical Chemistry, published 1924 by Longmans, Green and Company, 39 Paternoster Row, London EC4, England.